US012564200B2

(12) United States Patent
Grandi

(10) Patent No.: US 12,564,200 B2
(45) Date of Patent: Mar. 3, 2026

(54) PROCESS FOR THE PREPARATION OF UNDENATURED VEGETABLE PROTEIC ISOLATES

(71) Applicant: HIWEISS S.R.L., Bolzano (IT)

(72) Inventor: Mauro Grandi, Barbianello (IT)

(73) Assignee: HIWEISS S.R.L., Bolzano (IT)

( * ) Notice: Subject to any disclaimer, the term of this patent is extended or adjusted under 35 U.S.C. 154(b) by 930 days.

(21) Appl. No.: 17/786,927

(22) PCT Filed: Dec. 21, 2020

(86) PCT No.: PCT/IB2020/062277
§ 371 (c)(1),
(2) Date: Jun. 17, 2022

(87) PCT Pub. No.: WO2021/124307
PCT Pub. Date: Jun. 24, 2021

(65) Prior Publication Data
US 2023/0345965 A1      Nov. 2, 2023

(30) Foreign Application Priority Data

Dec. 20, 2019     (IT) ......................... 102019000024973

(51) Int. Cl.
*A23J 1/00*          (2006.01)
*A23J 1/12*          (2006.01)
*A23J 1/14*          (2006.01)
(52) U.S. Cl.
CPC ................. *A23J 1/007* (2013.01); *A23J 1/12* (2013.01); *A23J 1/14* (2013.01)

(58) Field of Classification Search
CPC ................. A23J 1/007; A23J 1/12; A23J 1/14
See application file for complete search history.

(56) References Cited

U.S. PATENT DOCUMENTS

| | | | |
|---|---|---|---|
| 2,326,195 A | 8/1943 | Bass et al. | |
| 4,285,862 A | 8/1981 | Murray et al. | |
| 4,418,013 A | 11/1983 | Cameron et al. | |
| 2007/0207254 A1 | 9/2007 | Crank | |
| 2012/0130051 A1 | 5/2012 | Medina et al. | |

FOREIGN PATENT DOCUMENTS

CA          3 026 600          1/2018

OTHER PUBLICATIONS

International Search Report for PCT/IB2020/062277, mailed Feb. 16, 2021, 4 pages.
Written Opinion of the ISA for PCT/IB2020/062277, mailed Feb. 16, 2021, 8 pages.

*Primary Examiner* — Jenna A Watts
(74) *Attorney, Agent, or Firm* — NIXON & VANDERHYE

(57) ABSTRACT

Disclosed is a process for the preparation of vegetable protein isolates of high quality, that allows maintaining in the final product the nutritional value and specific functionalities of the native biological activity of the proteins of the starting vegetable raw material. Also disclosed are the vegetable protein isolates obtained by this process and their use in the food sector.

17 Claims, 2 Drawing Sheets

PROCESS FOR THE PREPARATION OF UNDENATURED VEGETABLE PROTEIC ISOLATES

CROSS-REFERENCE TO RELATED APPLICATIONS

This application is the U.S. national phase of International Application No. PCT/IB2020/062277 filed Dec. 21, 2020 which designated the U.S. and claims priority to IT Patent Application No. 102019000024973 filed Dec. 20, 2019, the entire contents of each of which are hereby incorporated by reference.

BACKGROUND OF THE INVENTION

Field of the Invention

The present invention relates in general to the field of processing vegetable raw materials, and more precisely, it refers to a process for the preparation of high quality vegetable protein isolates, which allows maintaining in the final product the nutritional value and specific functions of the proteins of the starting vegetable raw material. The invention also relates to undenatured vegetable protein isolates obtained by this process and their use in the food sector.

Description of the Related Art

In recent years, also among industrial finished and semi-finished industrial products, the demand from consumers has increased for products that are of guaranteed vegetable origin and retain the qualitative characteristics of the starting raw materials, as well as their biological value and their natural functionality, also taking into due consideration the environmental profile.

In order to aspire to products with these characteristics, the starting vegetable material must obviously be subjected to treatments that must in their turn guarantee the desired ecology not only of the product after the treatment, but also of the conditions of the process itself and of the reagents and solvents used to carry it out. Currently, the quality of the production processes used, their environmental sustainability and the preservation of the characteristics of the raw material in the final product, especially in the food sector— but also in related sectors such as zootechny—represent the main demands of the market of industrialized countries.

In the last decades, the use of supplements has also increased in both human and animal diets, in particular the use of protein supplements. These supplements, in the form of protein isolates or concentrates having respectively a protein content of about 90% or 70% by weight with respect to the dry substance, are used as such and taken as supplements generally in the form of powders. Or they are used in industry not only to increase the protein content of foods, but also to refine their consistency thanks to the retention of liquids and lipids exerted by them and their emulsifying power, which has the ability to improve doughs in particular. Protein isolates are currently already present in several commonly used products, such as animal feed, breakfast cereals, desserts, products, meat substitutes, sauces and soups.

The processes commonly used for the production of protein isolates starting from vegetable raw materials, such as soybean, are based on the suspension of the raw material in an aqueous medium followed by the separation of the insoluble components, mainly insoluble carbohydrates, and subsequent isoelectric precipitation of the proteins with subsequent separation of the protein precipitate by centrifugation. The precipitation of the protein component is commonly carried out by bringing the pH of the aqueous solution to the isoelectric point of the proteins, around pH 4.5, by adding hydrochloric acid [1]. The precipitate, once separated and possibly neutralized, appears as a thick cream, which is then usually dried by techniques using high temperatures to make the process faster and industrially sustainable. The products obtained with these techniques are in the form of powders and can have a high protein content. The quality of the proteins in these protein isolates is however affected by the production method, in particular by the use of NaOH in the first step of suspension in water, which leads to a high sodium content in the final protein isolate. In addition, the quality of the final protein isolate is also affected by the addition, in this production method, of strong mineral acids such as HCl for precipitation at the isoelectric point and by the use of high temperatures for the final drying step. Under such conditions, chlorides were found in the final protein isolate and a denaturation of the proteins present were detected, with consequent loss of their functionality. By denaturation a change in structure and in chemical surface activities is meant, that involve a sterical, chemical variation, and a variation of the interactions with the molecules that originally interacted with the protein itself, and consequently a modification in biological function as well as in technological aptitudes, that this function allowed to exploit. A further disadvantage that weighs on the economy and environmental sustainability of these processes, always linked to the use of strong acids, is the consequent need, in the subsequent steps of the process, to neutralize by adding strong bases, from which salts are formed that must be then eliminated with repeated washing and use of large amounts of water.

A greater degree of protein preservation was obtained by using ultrafiltration as the only method of separating the protein component starting from protein material, instead of precipitation at the isoelectric point with strong acids [2]. Also the yields of protein isolate obtained are higher with this method, which would however be industrially not applicable to large-scale productions due to the inadequacy of time and intrinsic costs of the ultrafiltration method, due to the high energy consumption.

For these reasons, to date, the need is still felt to provide a production process of vegetable protein isolates, which is ecological but of simple industrial applicability, capable of providing with high yields high quality products, wherein the starting proteins are kept in their native form, with the nutritional and functional characteristics that they had in the starting raw material.

SUMMARY OF THE INVENTION

Now the Applicant has found that vegetable raw materials with a high protein content, in particular vegetable seeds, such as soybean or pea seeds, if solubilized in water and precipitated with a weak organic acid and with $CO_2$ according to the process described below in details, result in a final product that is a protein isolate. It has a very high protein content, which also maintained the functionality of the same proteins in the starting vegetable raw material.

Advantageously, all the reagents and solvents used in this process of preparation are not toxic to people or harmful to the environment, therefore they do not present problems related to the safety of use and to the health of the operators who handle them; moreover, they do not leave toxic traces or residues in the final product.

It is therefore subject of the present invention a process for preparing protein isolates as defined in the first of the claims annexed hereto.

The protein isolates obtainable by this process, their use as protein supplements in the food field, and the products comprising the present protein isolates represent a further subject of the present invention.

Further important characteristics of the process for the preparation of protein isolates, of the protein isolates thus obtained, of their use, and of the food products comprising the protein isolates according to the invention are illustrated in the following detailed description.

DESCRIPTION OF THE PREFERRED EMBODIMENTS

Figure 1:
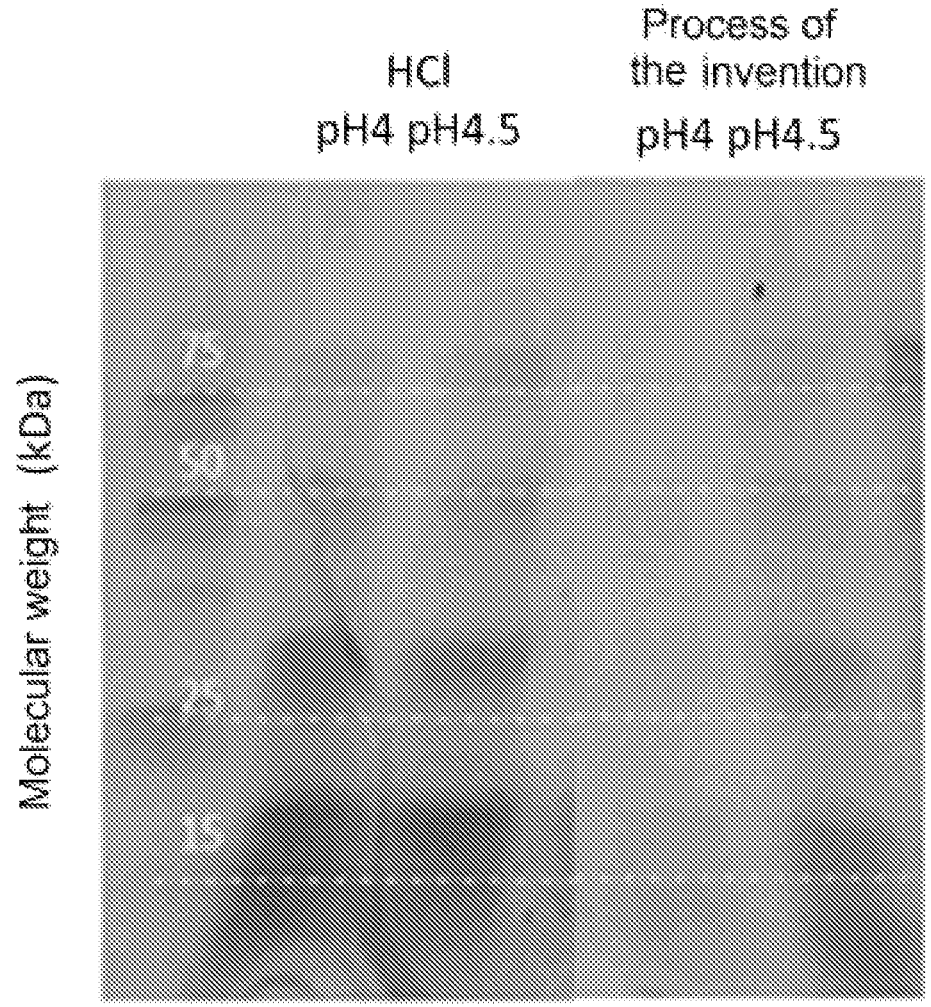
FIG. 1: electrophoretic profile obtained by SDS-PAGE electrophoresis of the protein fractions contained in the end sera of the present process at the end of stage iv) and of the comparison test with HCl described in the following Example 2.

In the following description, unless otherwise specified, the percentage amounts are expressed as percentages by weight with respect to the total weight of the composition comprising them.

The Applicant has surprisingly found that it is possible to obtain protein isolates of excellent quality, in terms of protein content and preservation of protein functionality, with a simple and industrially scalable process of preparation, starting from vegetable protein materials, in particular vegetable seeds or grains, such as soybeans, pea seeds, corn germs, buckwheat, and mixtures thereof. The scope of the present invention also includes starting materials not in the form of seeds or grains, as long as they are vegetable protein materials, i.e. materials with a high protein content, typically higher than 10% by weight on the dry matter, such as alfalfa.

The process of this invention allows obtaining protein isolates, wherein by "protein isolate" a product is meant having a protein content of about 90% by weight on the dry matter or higher, of exclusively vegetable origin. In the context of the present invention, by "undenatured protein isolate" a protein isolate is meant, in which the proteins contained therein are substantially undenatured.

The process for the preparation of undenatured protein isolates starting from vegetable protein material according to the invention comprises the following steps:

i) suspending said vegetable protein material in water with a pH higher than 7 in a diffuser under pressure with a pulsed pressure mixing system, with the formation of an alkaline aqueous suspension;

ii) treating said alkaline aqueous suspension formed in step i) to separate a solid residue comprising starch and fiber contained therein, and to obtain an aqueous suspension substantially free from fiber and starch;

iii) adding to the aqueous suspension obtained in step ii) a weak organic acid until a pH between 6.5 and 3.0 is reached;

iv) introducing the acidified suspension obtained in step iii) in a dissolver under $CO_2$ pressure thus forming a gelatinous protein mass and a whey;

v) separating the whey from said gelatinous protein mass, and deaerating it;

vi) dehydrating the deaerated gelatinous mass obtained in step v) to obtain the desired protein isolate, wherein each step from i) to vi) is carried out at room temperature or in any case at a temperature below 65° C.

The starting protein material is preferably subjected to drying, decorticating and/or crushing with suitable means, before solubilization in water in step i). For the seeds, crushing has the effect of detaching the pericarp of the seed, which is preferably removed by gravimetry or with a flow of air in depression, solubilizing only the seed present within the pericarp. The crushing can be followed by a conditioning step with alkalized water at a pH of between 7.2 and 8.5, for example for a time ranging from 5 minutes and 12 hours, until the endosperm of the seeds is brought to a humidity of between 15 and 22%. The seeds thus treated can be further ground in a suitable mill until a particulate is obtained, for example having an average particle size lower than 50 μm, which can be more easily solubilized in step i).

The suspension of the protein material in step i) of the present process is carried out with alkalized water at a pH preferably between 7.5 and 9.5, obtained for example by adding $Ca(OH)_2$ to the water. The amount of water used is preferably such as to obtain a volume ratio of between 1:5 and 1:30 for the protein material, preferably in particulate form, to water. Agitation or mixing means can be used in this step to favor and speed up solubilization. The mixing of the present process is advantageously carried out with a pulsed pressure mixing system. In an aspect of the invention, this system uses a centrifugal pump to pressurize the mixture at 4-6 bars of pressure and send it to an accumulation tank, from which the pipes to the mixing nozzles are derived, located at the base of the diffuser cone. These nozzles are integrated in a Venturi-type ejector and have a radial and tangential angle so that they draw liquid in the basal part of the ejector, which will thus result in depression. A mixing and extraction effect will be provided and, in the apical part of the ejector, a volumetric flow rate between 3 and 4 times the volumetric flow rate of the nozzle will be generated. The pulsed mixing system of this process, thanks to this increase in flow rate, accelerates the extraction process and determines a total mixing of the mixture within the entire volume of the diffuser without the introduction of compressed air or technical gases. However, the pressure inside the diffuser typically remains between 0.5 and 4 bar.

The aqueous suspension is typically retained in the reactor for the mixing for a time ranging from 5 minutes to 3 hours, depending on the starting material.

The separation of fiber and starch in step ii) of the present process can be carried out according to a technique that any expert with ordinary knowledge in the art can easily identify, such as filtration through suitable membranes or centrifugation/decantation. The content of fiber and starch separated from the aqueous suspension can possibly be recovered for other processing and uses, while the protein suspension is subjected to the subsequent step iii) of acidification.

One of the advantages of the process of this invention is that of preserving the functionality of the proteins present in the starting plant material: they are not denatured under the conditions of the present process, but kept in their native form. This is particularly desirable for the food uses of protein isolates, as it can guarantee the obtainment of a well-determined product, which will have the protein characteristics of the starting material, and a nutritional and functional value higher than the known products obtained with denaturing processes. From this derives the usefulness of the protein isolates obtained with this process, not only as protein supplements as such, but also as technological adjuvants in food products in order to enhance the biological functionality of proteins by borrowing the technological characteristics of the process.

As mentioned above, the known processes largely use strong acids to extract the proteins from the starting protein material, which have a denaturing effect on the proteins. While in the present process the pH of the isoelectric point of the proteins is obtained in step iii) of extraction by adding to the aqueous solution of the starting protein material of a weak organic acid, preferably selected from citric acid, tartaric acid, and mixtures thereof.

Citric acid is a triprotic organic acid while tartaric acid is a diprotic organic acid; these are weak acids, and as such, in the conditions of use of the present process, they guarantee the non-denaturation of proteins in the treated protein raw material, unlike treatments with strong acids of the state of the art. Citric acid and tartaric acid are preferred among weak organic acids due to their presence, also in nature, in plants and fruits, and for the presence of respectively three and two carboxylic acid groups as binding points, which according to the inventors favor the decantation of proteins. Without wishing to be bound to a theory, in the process of the invention the use of a diprotic acid, or even better of a triprotic acid, allows creating a lattice and make heavier the protein aggregate, thus favoring the decantation speed of the proteins without compromising their structure.

In the subsequent step iv) the acidified suspension is introduced into a dissolver under pressure of $CO_2$ with operating pressures preferably between 0.5 and 80 bar in order to further correct the pH within values between 6.5 and 3. The dissolution rate of the protein material and the separation rate of the gelatinous protein mass from the whey are thus extremely high and a better separation between the gelatinous mass and the whey is also obtained.

In a particular embodiment of the present process, the suspension before acidification and/or the whey at the outlet of the $CO_2$ dissolver are filtered with suitable filter means, and the filtrate is discarded. For example, the suspension before acidification can be filtered with a filter press or a filter under vacuum with an average porosity of less than 10 μm, while the end whey at the outlet of the $CO_2$ reactor can be filtered with membranes of porosity less than 20 kDa. The retentate containing the non-precipitated proteins is added back to the extracted liquid stream prior to the addition of citric acid. In the alternative, the extract can be separated from any fibers and starch left in suspension through a decanter, and then clarified, after acidification in the $CO_2$ reactor and using increasing pressures in order to lower the pH to the equivalent isoelectric point of the protein fraction to be isolated. After separation of the gelatinous protein mass from the whey, $CO_2$ is desorbed and then the extract, again subjected to centrifugal separation through a decanter, yields a protein isolate already at least partially neutralized, without the use of bases and further washings. It also yields a liquid whey of energetic interest or for use in agronomy, as a component for feed in the feeding of dairy cattle, in fattening cattle and in pig breeding. The whey obtained after isolation and separation of proteins can be directed to the energetic chain (anaerobic fermentation), or concentrated by means of vacuum concentrators or membranes having a porosity lower than 1000 Da to obtain products with a dry matter content 3-4 times more concentrated. Thus, they can be used for agronomic purposes, as organic fertilizers, phytostimulants, as such or with the addition of adequate aliquots of micronutrients or after their fermentation and/or supplementation with suitable microbial strains, in order to improve their phytostimulant performances. In yet a further alternative, this retentate can be concentrated in evaporators/concentrators suitable for obtaining sugar matrices with an adequate dry matter content, suitable for the formulation of products for agronomic, zootechnical and energetic use.

The dehydration in step vi) of the process can be carried out according to various known alternative drying techniques, always under non-denaturing conditions for the proteins. These conditions can be easily identified by any technician skilled in the art among the various methods available. Non-limiting examples of drying techniques suitable for use in step vi) of the present process are dehydration with a ring dehydrator, with a rotary drum or a fluid bed dryer. In a preferred embodiment of the present process, the dehydration in step vi) is carried out under a controlled atmosphere, or better under vacuum, in a thin film evaporator at a temperature below 50° C.

All steps of the process of this invention can be carried out at room temperature. When temperatures above the room temperature can favor the process, in particular in step i) of diffusion and solubilization and/or step vi) of dehydration, preferably the working temperature will not exceed 65'C, so as to avoid any risk of denaturation of proteins due to heating. In an aspect of the invention, step vi) is carried out by distributing, by means of rotating blades, the gelatinous protein mass to be dehydrated on the internal walls of a container equipped with an external heating jacket in a vacuum environment. In this way, the water contained in the gelatinous mass is evaporated in a short time, condenses in special heat exchangers and can thus be easily recovered and reused in step i) of solubilization.

Thanks to their characteristics, citric acid and $CO_2$ represent ideal products for use in an ecological process, such as that of the present invention, which does not require the use of any other solvent or reagent harmful to the environment, or which could still leave harmful impurities in the final product. Citric acid, among other things, is also naturally present in many plants and is even added to many food products for its preservative properties. Furthermore, this process is simple and safe, easily scalable at an industrial level; in particular, it does not require the use of high temperatures. This aspect of the process, together with the avoidance of strong acids and bases, which were generally used in the known processes, allows obtaining a final product with high protein content. The proteins original functionality is also largely preserved, with the consequent improved nutritional and functional characteristics with respect to the protein isolates obtained with the known processes under more or less denaturing conditions.

The extraction yields of isolated proteins obtainable with this process are higher than 80% by weight of proteins with respect to the total weight of the proteins contained in the starting raw material, expressed as dry matter. The proteins in the present isolate, thanks to the mild conditions usable in the present process, also maintain the peculiarities they had in the starting material, such as biological functions possessed in the cells and in the storage organs (seeds) during the phenological phases of the species of origin. The present process in fact allows avoiding the denaturation of the proteins present in the starting plant material, by not using strong mineral acids for the precipitation phase nor by subjecting the obtained proteinate to consequent washing and neutralization cycles with alkaline substances. In addition to this main advantage of maintaining the characteristics of native proteins, the present process is also characterized by a greater simplicity than known processes, by the reduction in the use of water and by the lack of contamination in the final commercial isolate. This contamination in the known processes is caused by the use of bases for the neutralization of the extracted proteinate under strongly acidic conditions. Furthermore, the temperatures used in the various phases of the present process also limit the thermal denaturation of the native protein to the maximum and therefore help to preserve their natural biological and technological functionality as well.

The dehydrated protein isolate is obtained with the process of the invention in the form of particles with particles size between 10 and 100 micrometers and a moisture content of less than 5%. Depending on the starting plant material used and the pH of isolation, the present protein isolate has a color that can vary from off-white to straw yellow to pale green. The dried protein isolate is highly hygroscopic, capable of absorbing water from 5 to 20 times with respect to the anhydrous weight, with a high dispersing and emulsifying capacity of fatty substances on dispersing aqueous phases or on wetted surfaces. The present protein isolate also showed a high thickening, binding capacity, capable of generating more or less thin foam depending on the concentration of the protein in the medium and on the type of air inclusion system. If heated to temperatures above 65° C. for variable times, this protein isolate generates a denatured form, which massifies the structure with which it interacted, losing its original characteristics but stabilizing its structure.

The present protein isolate, moreover, as shown in the experimental part that follows, is characterized by the absence of chlorides and a reduced sodium content, between 0 and 0.02% by weight with respect to the total weight of the dry isolate.

These characteristics of the protein isolate obtainable with the process of the invention make it particularly useful for the use as such as a protein supplement. On the other hand, it can be used in industry both to increase the protein content of foods, in particular those intended for childhood or for diets without animal proteins, and to refine the consistency of the dough thanks to its emulsifying power.

The invention is described below by means of examples without however being limited thereto, but it is understood that the quantities and percentages of the reagents described can be varied, as well as the type of reactors and more generally of the conditions used while remaining within scope of the present invention.

Example 1

Preparation of Protein Isolate from Soybeans

Soybeans, previously air-dried at room temperature, with a dry matter content of 87% by weight, have been crushed with counter-rotating roller calenders and the pericarp of the seed was removed by gravimetry. The broken seeds have been conditioned by adding alkalized water at pH 8 over a time of 30 minutes, bringing the dry matter content to 78% by weight. The crushed and conditioned seeds have been ground with a mill designed not to heat the seeds above 50° C., thus obtaining a particulate with average size particles between 10 and 70 μm.

Then, the flour obtained was sent to a diffuser, at a controlled pH and in a weight ratio with water of 1:15, and remained therein at a pressure of 5 bar for a time of 40 minutes. The content of the diffuser was sent to a filtering system (plate filter, flood filter, rotary vacuum filter) or to a series thereof, alternatively through a decanter in order to separate the fiber from the liquid phase also containing the proteins solubilized by the diffuser. The liquid extract has been then added with citric acid and/or tartaric acid until a pH of 6.3 is obtained. The extract, corrected in the pH, was then reacted in a special dissolver under pressure of $CO_2$ reaching a pressure of 20 bar, then of 80 bar, in order to obtain two pH values compatible with the isoelectric point of the protein fractions to be isolated. During the stay of the liquid extract in the inert gas reactor, a sequence of pressure peaks was practiced by means of introduction of $CO_2$. The liquid leaving the $CO_2$ reactor was subjected to desorption of carbon dioxide in a controlled pressure environment, then sent to a decanter that separates the protein fraction from the whey containing water, sugars such as sucrose, stachyose, verbascose, raffinose, partially soluble hydrophilic fibers, low molecular weight proteins, free amino acid peptones, and traces of nucleic acids.

The protein mass, already neutralized after the desorption of $CO_2$, was sent to a vacuum dryer operating at temperatures below 50° C. which brought the water content to a percentage lower than 5% by weight. A part of the $CO_2$ still trapped in the gelatinous mass of the protein isolate was released due to the negative pressure inside the dryer, increasing the rate of water loss and the porosity of the final dried product, with advantages related to its re-solubilization and/or speed of hydration. The soy fiber obtained from the extract by filtration was dried with a ring dehydrator, obtaining the dry protein isolate with a protein content higher than 80% by weight compared to the total weight of the proteins in the starting soybean.

Example 2

Characterization of the Protein Isolate Obtained with the Present Process

The protein isolate obtained with the process of the invention as described above in Example 1 was compared with the protein isolate obtained starting from the same starting material with a known extraction process, in which a direct acidification with HCl is carried out instead of steps iii) and iv) of the present process.

The results, shown in the following Table 1, show a greater recovery of the proteins present in the starting matrix with the extraction process of the present invention compared to the state of the art process, for two different precipitation pH values.

TABLE 1

| pH of precipitation | % of proteins with respect to total proteins contained in the starting matrix | |
| --- | --- | --- |
| | State of the Art HCl | Present Invention Citric Acid + $CO_2$ |
| 4 | 80.53 ± 3.64 | 85.58 ± 5.77 |
| 4.5 | 78.73 ± 5.47 | 82.10 ± 0.95 |

Furthermore, the electrophoretic profile of the protein fractions contained within the end sera for the two processes (FIG. 1), obtained by SDS-PAGE electrophoresis, has highlighted a different distribution of the molecular weights obtained with the different precipitation methods. In particular, the electrophoretic analysis showed how the use of hydrochloric acid does not allow precipitating low molecular weight proteins, as opposite to the present process.

Example 3

Preparation of a Protein Isolate from Other Vegetable Raw Materials and its Characterization The process described above in Example 1 has been repeated using different vegetable raw materials, i.e. pea seeds, chickpeas, lentils, buckwheat and corn germ, under the same conditions and with the same reagents described above in Example 1. Also the results in terms of protein content were the same. Whey and waste fiber have been recovered as described above, and in the case of pea seeds, chickpea, lentils, and buckwheat, it was possible to recover a fraction of starch too.

Pea protein isolate was analyzed and compared with commercial pea proteins for the sodium (Na) content, the chloride (Cl) content and for the proteins native state.

The proteins obtained with the present process showed a lower Na content than the commercial sample, while the chlorides, completely absent from the isolate of the invention, were present in the commercial sample.

Table 2 below shows these results in terms of sodium or chloride content as % by weight with respect to the total weight of the dry isolate.

TABLE 2

|  | Content of Na (% p/p) | Content of Cl (% p/p) |
|---|---|---|
| Commercial pea proteins | 0.81 | 0.0125 |
| Protein isolate from peas of the invention | 0.019 | absent |

Figure 2A:
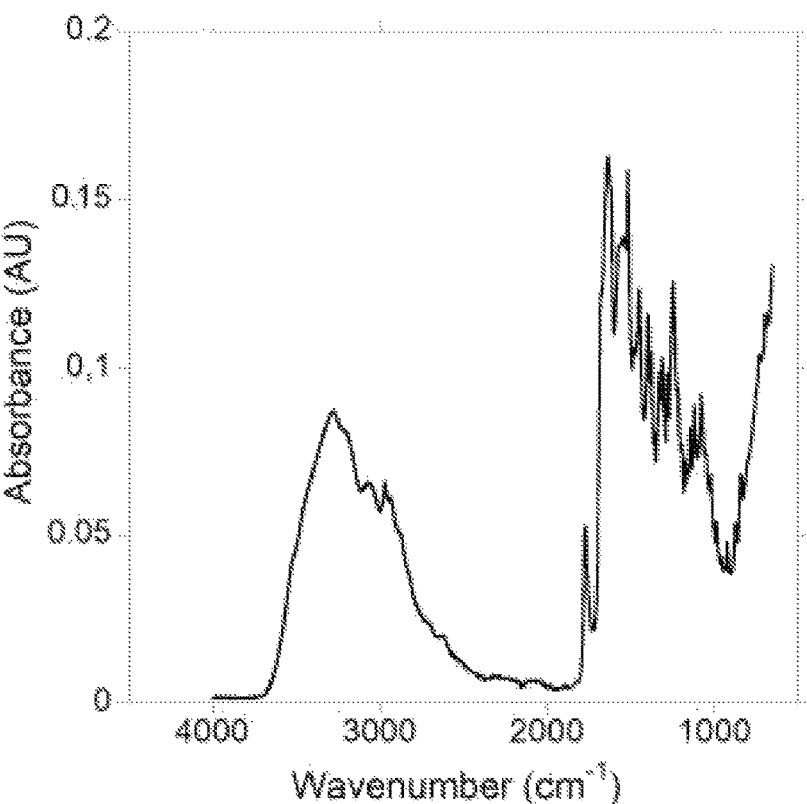
FIG. 2a: spectroscopic profile obtained for commercial pea proteins by Fourier transform infrared spectroscopy (FT-IR)
Figure 2B:
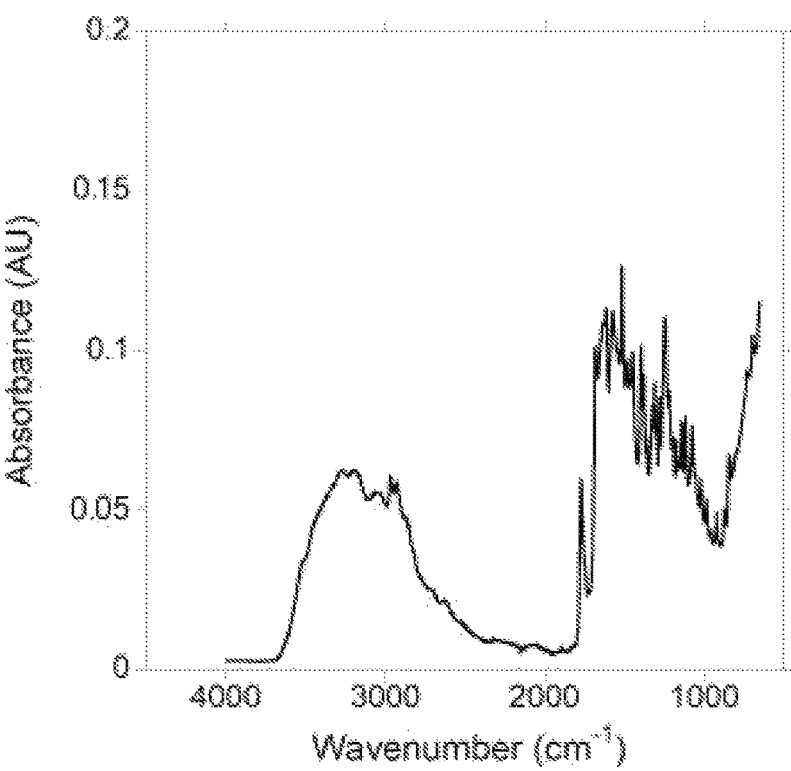
FIG. 2b: FT-IR spectroscopic profile of the pea protein isolate obtained by the present process, as described in the following Example 3.

The secondary structure of the proteins was evaluated by analysis of Fourier transform infrared spectroscopy (FT-IR), whose results are shown in FIGS. 2a (commercial pea proteins) and 2b (protein isolate of the invention). This study confirmed that the secondary structure of the proteins is not altered by the extraction process of the present invention, in accordance with what found for the sample of commercial pea proteins.

Example 4

Preparation of Food Products with Protein Isolates of the Invention

The protein isolates prepared as described above in Examples 1 and 3 have been used to prepare various food products, in particular mayonnaise without eggs, ice cream, baked products and leavened products by using soft wheat flour without eggs, pasta with gluten-free flours (in particular corn flour, rice flour and their combinations) and without eggs, custard without eggs, vegan preparations without margarine, meat-based preparations without adding flour, eggs or thickeners and without releasing water during cooking, crispy breading without gluten and egg-free. Protein isolates have been added, depending on the type of products prepared, in amounts between 0.5 and 8% by weight with respect to the total weight of the ingredients, obtaining in any case excellent results in terms of workability of the dough, stability and consistency of the final product.

The present invention has been described up to now with reference to a preferred embodiment thereof. It is to be understood that there may be other embodiments that refer to the same inventive core, as defined by the scope of the claims set out below.

BIBLIOGRAPHICAL REFERENCES

[1] Liu KS (1997), Soybeans: Chemistry, Technology and Utilization, (Primera Edicion), Singapore, International Thomson Publishing Asia.

[2] Taherian A., Mondor M. & Lamarche F. (2012). Enhancing Nutritional Values and Functional Properties of yellow pea protein in via membrane processing. Cultivation, Varieties and Nutritional Uses: Chapter 1. ISBN: 978-1-61942-866.

The invention claimed is:

1. A process for the preparation of undenatured protein isolates starting from vegetable protein material comprising:
   i) suspending said vegetable protein material in water at pH higher than 7 in a diffuser under pressure with a pulsed-air mixing system, thus forming an alkaline aqueous suspension;
   ii) treatment of said alkaline aqueous suspension formed in step i) in order to separate a solid residue comprising fiber and starch therein contained, obtain an aqueous suspension substantially free from starch and fiber;
   iii) adding an organic weak acid to the alkaline aqueous suspension formed in step ii), up to a pH ranging between 6.5 and 3.0;
   iv) introducing the acidified suspension coming from step iii) in a $CO_2$ dissolver thus forming a gelatinous proteic mass and whey;
   v) separating whey from said gelatinous proteic mass and deaerating thereof;
   vi) dehydrating of said deaerated gelatinous proteic mass coming from step v) to obtain the desired protein isolate,
   wherein each step from i) to vi) is carried out at room temperature or anyway at a temperature lower than 65° C.

2. The process according to claim 1, wherein said vegetable protein material is selected from alfalfa and plant seeds or grains, and mixtures thereof.

3. The process according to claim 1, wherein said weak organic acid in step iii) is selected from citric acid, tartaric acid and mixtures thereof.

4. The process according to claim 1, wherein in said step i) the amount of water used is such as to obtain a volume ratio ranging between 1:5 and 1:30 between the protein material and water.

5. The process according to claim 1, wherein said suspension in step i) is carried out by means of a pulsed-air mixing system for a time ranging between 5 minutes and 3 hours.

6. The process according to claim 1, wherein said acidified suspension in step iv) is introduced into a CO2 dissolver at operating pressure ranging between 0.5 and 80 bars.

7. The process according to claim 1, wherein said dehydration in step vi) is carried out under oxygen-free atmosphere and under vacuum.

8. The process according to claim 1, wherein said step vi) is carried out at a temperature lower than 50° C. in a thin film evaporator under vacuum.

9. The process according to claim 1, further comprising, before suspension in said step i), a drying, decorticating and/or crushing treatment of said protein material.

10. The process according to claim 6, further comprising the crushing of said protein material until a particulate is obtained.

11. The process according to claim 1, wherein said treatment of the alkaline aqueous suspension to separate fiber and starch in step ii) is carried out by filtering through suitable membranes or by centrifugation and decantation.

12. The process of claim 2, wherein the vegetable protein comprises at least one of soya seeds, peas seeds, chickpeas, corn germ, and buckwheat.

13. The process of claim 9, further comprising a conditioning step with alkalized water at pH ranging between 7.2 and 8.5, for a time ranging between 5 minutes and 12 hours.

14. The process of claim 10, wherein the particulate obtained has an average particle size of the less than 50 μm.

15. The process according to claim 2, wherein said weak organic acid in step iii) is selected from citric acid, tartaric acid and mixtures thereof.

16. The process according to claim 2, wherein in said step i) the amount of water used is such as to obtain a volume ratio ranging between 1:5 and 1:30 between the protein material and water.

17. The process according to claim 3, wherein in said step i) the amount of water used is such as to obtain a volume ratio ranging between 1:5 and 1:30 between the protein material and water.

\* \* \* \* \*